United States Patent Office 3,796,652
Patented Mar. 12, 1974

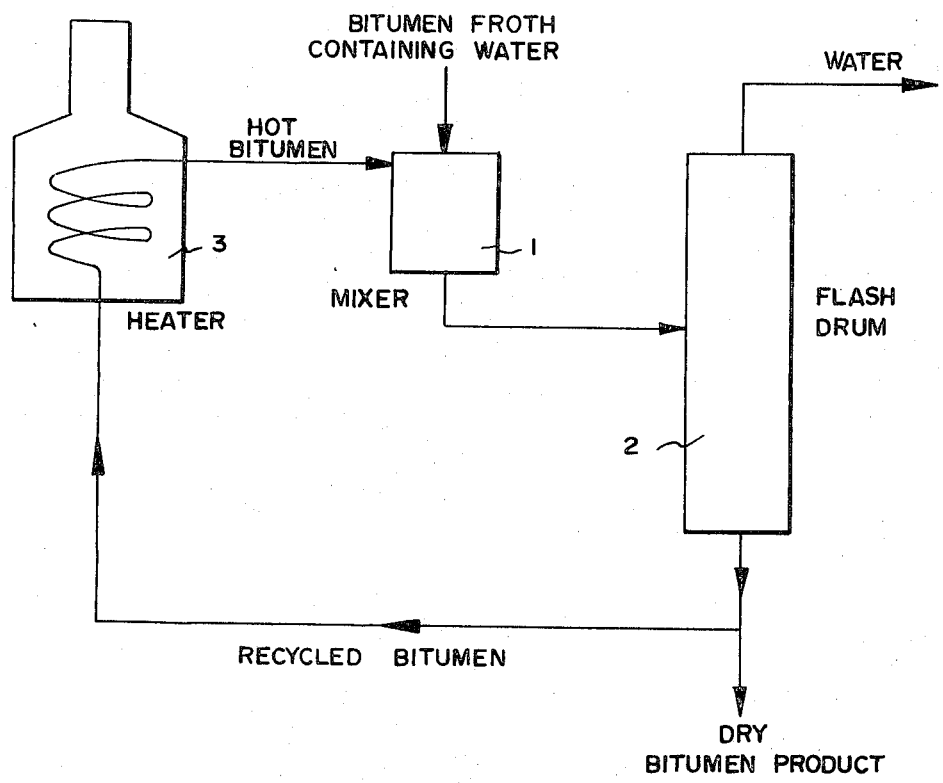

3,796,652
THERMAL DEHYDRATION OF BITUMEN FROTH
Silver Lupul, Sherwood Park, Alberta, Canada, assignor to Canada-Cities Service, Ltd., Imperial Oil Limited, Atlantic Richfield Canada, Ltd., and Gulf Oil Canada Limited, fractional part interest to each
Filed Jan. 15, 1973, Ser. No. 323,454
Int. Cl. C10c 3/00
U.S. Cl. 208—39                    5 Claims

ABSTRACT OF THE DISCLOSURE

Bitumen froth containing water is contacted with hot dry bitumen in a mixer to vaporize all the water. The mixture is flashed to remove the water vapor and produce dry bitumen. Part of this latter product is heated and recycled to the mixer.

BACKGROUND OF THE INVENTION

This invention relates to a process for thermally dehydrating bitumen froth. It finds application as one of the operations in the combination of operations by which bitumen is extracted from tar sand.

A large proportion of the world's known hydrocarbon reserves exists in the form of tar sand. One large deposit of this material is found along the banks of the Athabasca River in Alberta. The tar sand comprises water-wet grains of sand sheathed in films of bitumen. In treating the tar sand to recover commercially saleable products, it is first necessary to separate the bitumen from the water and sand.

The extraction method commonly applied is known as the hot water method. In board outline, this method involves contacting the tar sand in a tumbler with hot water and steam. The water is supplied at a temperature of about 180° F. and in a amount sufficient to produce a slurry containing about 20 to 25% by weight water. The steam is supplied in an amount sufficient to ensure that the slurry temperature is about 180° F. During slurrying, the bitumen films are ruptured and a preliminary separation of the sand grains and bitumen flecks takes place. At the same time, air bubbles are entrained in the slurry. More hot water is added to the slurry after it leaves the tumbler—typically this might raise the slurry water content to about 50%. The diluted slurry is then introduced into a separator cell containing a body of hot water. The contents of the cell are commonly maintained at about 180° F. In the cell, the bitumen particles, which have become attached to air bubbles, tend to rise to the surface of the water body and form an oily primary froth. This froth is recovered in a launder running around the rim of the cell. The coarse sand particles tend to sink to the bottom of the cell and are drawn off as tailings. A middlings stream, comprising water, fine solids (minus 325 mesh) and some bitumen, is continuously withdrawn from the cell at a point intermediate its ends. This middlings stream is treated in a sub-aerated flotation cell to recover the contained bitumen in the form of secondary froth. The primary and secondary froths are combined and transferred into a holding tank to remove some of the contained solids and water by gravity settling.

All of the previously described process is extensively described in the literature and does not form part of the present invention. However, it does produce the feed stock, bitumen froth containing solids and water, which is treated in accordance with this process. While the composition of the froth can vary, it typically comprises 30% by weight water, 10% solids and 60% bitumen.

Before the bitumen in the froth can be treated to recover salable products, it is necessary to remove most of the water. This has been done by diluting the froth with naphtha and centrifuging the product to remove the water. However, this prior art system involves expensive, high-wear equipment. Alternatively, the froth has been heated indirectly in an exchanger with steam to vaporize the water; the water vapor was subsequently flashed off. However, this process was not pursued, mainly because of the fouling of the exchanger tubes by clay left behind by the froth.

SUMMARY OF THE INVENTION

The present invention is concerned with that type of thermal dehydration process wherein the bitumen froth is heated, to vaporize contained water, and is then flashed to separate the water vapor from the bitumen. The process has been developed with the objects of: (1) avoiding the use of heat exchangers; (2) minimizing foaming and keeping it within predictable limits; and (3) keeping equipment costs low.

In accordance with the invention, dry bitumen is used as the vehicle for heating the froth. The bitumen is preheated to at least 300° F., preferably to a temperature in the range 600–700° F. It is mixed with the froth in a co-current flow mixer. The bitumen temperature, the amount of bitumen used, and the mixer residence time are selected having regard to the requirement that the desired amount of vaporization must be completed within the mixer. The mixer product is flashed in a flash zone of sufficient volume and reduced pressure to produce water as overhead product and dry or substantially dry bitumen as the bottom product. Part of this bottom product may be recycled to the pre-heating step mentioned above.

The mixer itself may be a downflow vessel having staggered, vertically spaced plates which blank off the vessel cross section to restrict the flow area to about 20%. Alternatively, the mixer may be of the cyclone type, as was used in the example following hereinbelow.

The process is operated so that substantially all water vaporization is carried out in the mixer. This is achieved by maintaining the temperature ($Tm$) of the mixer product stream about the same as the temperature ($Tf$) of the flash vessel bitumen stream. Preferably the temperature difference is maintained at less than 10° F. One way of doing this involves feeding the hot dry bitumen to the mixer at a constant rate and temperature, monitoring $Tm$ and $Tf$, and manipulating the rate at which froth is admitted to the mixer to maintain $Tm$ equal to $Tf$.

The process is characterized by several advantages. By heating dry bitumen instead of froth, erosion of furnace tubes is reduced because of lower fluid velocities. The capital cost of the mixer and flash vessel is less than that of the equipment used in prior art processes. By carrying out vaporization in the mixer and maintaining $Tm$ and $Tf$ equal, it is found that the amount of foam generated in the flash vessel is reduced and its behaviour within the vessel is reasonably predictable; this latter characteristic permits one to select the smallest possible flash vessel for a given feed stock and operating conditions. Finally, the bitumen product contains only a small amount of water and this content is reasonably consistent over a prolonged period of operation.

Broadly stated, the invention comprises a thermal dehydration process for treating bitumen froth containing water, which process comprises: (a) heating substantially dry bitumen to a temperature greater than 300° F.; (b) mixing bitumen froth with a sufficient amount of the hot, dry bitumen of step (a) for a sufficiently long period of time to vaporize a predetermined amount of the water contained in the froth; and (c) flashing the product mixture to separate substantially all the vaporized water from the bitumen.

DESCRIPTION OF THE DRAWING

In the drawing, FIG. 1 is a flow diagram illustrating the steps of the process.

DESCRIPTION OF THE PREFERRED EMBODIMENT

The process is exemplified by the following example:

An Athabasca tar sand bitumen froth feedstock, comprising 30% by weight water, 10% solids and 60% bitumen, was fed, together with a hot, dry bitumen stream comprising ½% by weight water, 15% solids and the balance bitumen, into a mixer 1. The relevant flow rates, temperatures and analyses were as follows for a run of 20 hours:

TABLE I

| Flow rates (lbs./hr.) | | | Temperature, ° F. | | | | | Analyses (percent water) | | |
|---|---|---|---|---|---|---|---|---|---|---|
| Froth | Hot, dry bitumen | Water | Froth | Hot, dry bitumen | Mixture | Bitumen product | Water | Froth | Bitumen product | Water |
| 1,400 | 3,500 | 490 | 150 | 610 | 305–310 | 300 | 290 | 33 | 0.5 | 95 |
| 640 | 2,000 | 220 | 175 | 600 | 300–310 | 300 | 287 | 33 | 0.5 | 95 |

The mixer 1 comprised a series of six cyclone mixers. Each cyclone had a cylindrical top section, provided with a tangential inlet, and a conical bottom section. The top section had a diameter of 4 inches and length of 6 inches. The bottom section reduced over a length of 4 inches to an outlet diameter of 1 inch. The cyclones were connected by 1 inch diameter pipe. The inlet pressure to the first cyclone was 55 p.s.i. and the outlet pressure from the last cyclone was 15 p.s.i. The temperature of the product stream was maintained at about 300° F.

The mixture was fed directly into a flash drum 2. This vessel was cylindrical in shape and had an interior diameter of 8 inches and a length of 38 feet. Its feed inlet was located 10 feet from its top. The drum 2 was operated to maintain a fluid depth of about 20 feet, a foam disengagement zone about 8 feet in length, and a pressure of 4 p.s.i. The flow rates, temperatures and compositions of the product streams from the drum are given in Table I.

As shown in Table I, the process was operated to maintain the mixer product stream at the same temperature as the flash drum bottom product. This was done by manipulating the rate of froth feed to the mixer 1. It was found that the levels of the various layers within the drum 2 remained substantially constant under these conditions.

Our work has shown that the process must be operated with a recycle oil temperature between 300° F. and 700° F. to vaporize the water at an acceptable rate. Preferably, it should be operated between 600° F. and 700° F. Below 600° F., the material recirculation rate becomes excessive; above 700° F., cracking of the bitumen begins to occur.

While the invention has been described in detail with respect to a preferred embodiment, it will be understood by those skilled in the art that various changes and modifications may be made without departing from the spirit and scope of the invention and it is intended to cover all such changes and modifications in the appended claims.

What is claimed is:

1. A process for separating water from bitumen froth which comprises:
   (a) heating substantially dry bitumen to a temperature greater than 300° F.;
   (b) mixing bitumen froth with a sufficient amount of the hot, dry bitumen from step (a) for a sufficiently long period of time to vaporize a pre-determined amount of the water contained in the froth; and
   (c) flashing the product mixture to separate substantially all the vaporized water from the bitumen.

2. The process as set forth in claim 1 wherein: the addition of bitumen froth to the mixing step is controlled to maintain the temperature of the product leaving the mixing step substantially equal to the temperature of the bitumen product from the flashing step.

3. A process for separating water from bitumen froth which comprises:
   (a) heating substantially dry bitumen to a temperature within the range 600° F. to 700° F.;
   (b) co-currently mixing bitumen froth with a sufficient amount of the hot, dry bitumen of step (a) for a sufficiently long period of time to vaporize substantially all of the water contained in the froth;
   (c) flashing the product mixture in a flash zone of sufficient volume to permit of the separation of substantially all the vaporized water from the bitumen whereby an overhead product of water and a bottom product of substantially dry bitumen are produced from the flash zone; and
   (d) recycling part of the bottom product to provide dry bitumen for step (a).

4. The process as set forth in claim 3 wherein: the addition of one of the components mixed in the mixing step is controlled to maintain the temperature of the product from step (b) substantially equal to the temperature of the bottom product from step (c).

5. The process as set forth in claim 1 wherein: the bitumen froth and hot, dry bitumen are mixed co-currently.

References Cited
UNITED STATES PATENTS

| | | | |
|---|---|---|---|
| 2,550,432 | 4/1951 | Thompson | 208—11 |
| 2,775,541 | 12/1956 | Karl | 208—187 |
| 3,208,930 | 9/1965 | Andrassy | 208—39 |
| 3,296,117 | 1/1967 | Ross et al. | 208—188 |
| 3,330,757 | 7/1967 | Bichard | 208—11 |
| 3,331,765 | 7/1967 | Canevari et al. | 208—188 |
| 3,338,814 | 8/1967 | Given et al. | 208—11 |
| 3,466,240 | 9/1969 | Steinmetz | 208—11 |
| 3,489,672 | 1/1970 | Schulman et al. | 208—11 |
| 3,556,980 | 1/1971 | Clark et al. | 208—187 |
| 3,684,699 | 8/1972 | Vermeulen et al. | 208—188 |

DELBERT E. GANTZ, Primary Examiner

V. O'KEEFE, Assistant Examiner

U.S. Cl. X.R.

208—11, 187, 188